United States Patent [19]

Antonelli, Sr.

[11] 4,142,903
[45] Mar. 6, 1979

[54] CORROSION RESISTANT COATING COMPOSITION

[76] Inventor: Michael Antonelli, Sr., 620 Trebisky, South Euclid, Ohio 44143

[21] Appl. No.: 844,898

[22] Filed: Oct. 25, 1977

Related U.S. Application Data

[63] Continuation-in-part of Ser. No. 674,095, Apr. 6, 1976, abandoned.

[51] Int. Cl.$^2$ .............................................. C09D 5/08
[52] U.S. Cl. .............................. 106/14.24; 106/14.28; 106/14.29; 106/14.31; 106/14.36; 106/14.37; 106/14.38; 106/14.42; 106/14.43; 106/230; 106/233; 106/239; 106/268; 106/269; 106/271; 106/273 N; 106/274; 106/278; 252/391; 252/394; 252/395

[58] Field of Search .................. 106/14, 273 N, 274, 106/279, 275, 281 N, 278, 230, 233, 239, 268, 269, 271; 252/390, 391, 394, 395

[56] References Cited

U.S. PATENT DOCUMENTS

| 2,403,067 | 7/1946 | Fischer et al. | 106/14 |
| 2,836,499 | 5/1958 | Lyons | 106/14 |
| 3,434,851 | 3/1969 | Miller | 106/14 |
| 3,582,367 | 6/1971 | Miller et al. | 106/14 |

*Primary Examiner*—Lorenzo B. Hayes

[57] ABSTRACT

A corrosion resistant coating composition is provided which is a one-quart system. The composition is an asphaltic-base material containing a petroleum sulfonate and a sufficient amount of an organic solvent to impart the desired viscosity. A source of amine groups, such as a polyamide resin, is added and the resulting composition has improved adherence to the metallic substrate.

7 Claims, No Drawings

CORROSION RESISTANT COATING COMPOSITION

CROSS-REFERENCE TO RELATED APPLICATIONS

This application is a continuation-in-part of application Ser. No. 674,095, filed Apr. 6, 1976, now abandoned.

BACKGROUND OF THE INVENTION

The present invention relates to coating compositions for providing corrosion resistance on metallic substances, and more particularly, to such a coating composition that is especially useful for preventing rust and corrosion on vehicle underbodies and interior body parts. Importantly, the composition of the present invention may be used inside frames, on hidden supports and to cover many irregular surfaces which cannot be coated with the typical, more viscous compositions of the prior art. Therefore, the term "underbody" as used hereinafter will be understood to refer to all such parts of a vehicle.

Therefore, although it will be appreciated by those skilled in the art that the coating composition of the present invention may be applied to any type of metallic substrate, whether ferrous or non-ferrous, it is especially suited for use on ferrous surfaces and will be described in connection therewith.

In various areas of the country in which motor vehicle underbodies are subjected to mixtures of moisture and salt, it has become customary to coat the underbody of the vehicle with a protective "undercoating." Conventional undercoatings have been primarily of the asphaltic type, which sets up to form a dry, hard coating which, when it is tightly adhered to the metal substrate, provides fairly satisfactory resistance to rusting and corrosion of the substrate.

One of the more serious disadvantages of the prior art asphaltic-type compositions is their tendency to become brittle, crack and separate from the substrate over local areas, forming a pocket which can trap corrosive salt water and keep it in contact with the metal substrate over an extended period of time.

Another disadvantage encountered with many prior art compositions is the necessity of applying them as a two-part system, with the two separate applied coatings reacting chemically after application. Two-part systems obviously require an excessive amount of labor time and equipment utilization. Therefore, as used herein, the term "one-part", in reference to the composition of the present invention, means one in which all of the necessary ingredients may be combined as one mixture, for application as one coat.

SUMMARY OF THE INVENTION

Accordingly, it is an object of the present invention to provide an improved coating composition of the type useable as an undercoating for vehicle underbodies and interior body panels, wherein the coating composition is a one-part system.

It is a more specific object of the present invention to provide such a coating composition which has an improved ability to adhere to the metal substrate, as well as a greater resistance to brittleness and cracking.

It is a further object of the present invention to provide a coating composition which utilizes a combination of ingredients, each of which has rust inhibiting properties, wherein the combination is superior to the individual ingredients in the key qualities such as sprayability, longevity, drying and resistance to dripping.

The above, and other objects of the present invention are accomplished by the provision of a one-part coating composition which has, as its base, a liquid asphaltic bitumen, comprising about 15% to about 30% by volume of the entire composition. To the asphalt is added a soap, such as a metallic soap, which is optional but may comprise as much as 35% by volume of the composition. Also included is about 20% to about 60% by volume of petroleum sulfonate and, optionally, a carrier for the sulfonate, such as a microcrystalline wax or a solvent. Additional corrosion resistance as well as adhesion is provided by small amounts of a polyamide resin (about 3% to about 8%) and a rosin oil (about 1% to about 8%). An organic solvent is added to the mixture in an amount sufficient to give the final composition a viscosity which makes it suitable for application by conventional spraying techniques and equipment.

DESCRIPTION OF THE PREFERRED EMBODIMENT

The following detailed description of the preferred embodiment of the invention is intended to explain and clarify, but not limit the invention. The first component of the coating composition is the asphaltic bitumen which acts as a corrosion inhibitor and imparts wearability to the composition. The asphaltic bitumen may be either a single material or may be a blend or amalgamation of several asphaltic materials. Typical origins for asphaltic bitumens are the distillation of coal tar, distillation from crude oil or topped crude, recovery from acid sludges, removal from heavy residual oils produced in catalytic cracking or any other suitable means. It should also be understood that, in addition to the true "asphalts", various other materials may be used, such as the asphaltenes, asphaltites, and various resins and pitches, all of which are asphaltic in character. Thus, as used herein, the term "asphaltic bitumen" includes and means all of the true asphalts, the asphaltic-like materials and mixtures thereof. It is preferred that the bitumen for use in the present invention have a needle penetration (at 25° C.) of about 25 to about 35, and in one particular commercial formulation, the penetration was 30.

The second component of the coating composition is the soap, preferably a metallic soap, which serves as a corrosion barrier, and increases the elasticity and plyability of the cured coating. Among those which may be used are metallic soaps such as the calcium, lithium, barium, aluminum soaps and the bentonite soaps of fatty acids, all of which are highly water resistant. The composition and preparation of metal soaps and bentonite soaps of fatty acids is believed to be well known to those skilled in the art, and is described in greater detail in U.S. Pat. No. 3,293,050, which is incorporated herein by reference.

The third ingredient of the composition is the petroleum sulfonate, which is a good rust inhibitor and corrosion barrier. Examples of commercially available petroleum sulfonates useable herein are those sold under the trade name "Sodium PETRONATE" and "Calcium PETRONATE" by Witco Chemical. Petroleum sulfonates may be obtained by sulphonating various petroleum hydrocarbon fractions with materials such as sulphuric acid, oleum, chlorosulphonic acid, sulphur trioxide, or mixtures thereof. Petroleum hydrocarbons may be treated with sulphur dioxide and a halogen and the resulting product hydrolyzed and neutralized to produce sulphonated hydrocarbons. The petroleum hydrocarbons may be aliphatic, cyclic and/or aromatic. More specifically, they may be gas oil, kerosene, light oil, turbine oil, mineral lubricating oil or heavy oil. Generally, any petroleum hydrocarbon which is normally liquid is suitable for the production of the sulphonated hydrocarbons.

The fourth ingredient is a carrier for the petroleum sulfonate. The carrier may be a material such as a paraffinic oil, an organic solvent or many of the well-known organic dilluents, but in the preferred embodiment, a microcrystalline wax is used. The micro wax also is a rust inhibitor and is a good coating agent.

The first component is about 3% to about 8% by volume of the entire composition of a polyamide resin which is included partly as a rust inhibitor, as a filler, and as a drier, but more importantly, because it has been found that the addition of such a resin greatly improves the adhesion or adherence of the coating to the metal substrate, as well as serving as a drying agent or "set-up" agent. Furthermore, it has been found desirable to use a resin having a Brookfield viscosity in the range of about 6 to about 10 poises (at 75° C.) and an amine value in the range of about 300 to about 400. An example of such a resin, and one which was used in a commercial formulation, is a polyamide resin sold under the trade name "Versamid 125" by General Mills Chemicals, having a Brookfield viscosity of 7 to 9 poises and an amine value of 330 to 360. By way of example only, and not limitation, the particular polyamide resin referred to above is a reaction product of a dimerized fatty acid and an amine, the reaction product being a reactive liquid amine, i.e., it is a source of reactive amine groups. It is believed to be within the knowledge of those skilled in the art to coordinate the percent by volume of the polyamide resin with the amine value of the particular resin to achieve the desired level of adherence of the composition, subsequent to a reading and understanding of the present specification.

It should be apparent to those skilled in the art that various other sources of amine groups may be used, and that particular ones useable will be seen after reviewing the remainder of the specification.

Also preferable included in the composition is a small amount (about 1% to about 8% by volume) of rosin oil, which, because it is non-oxidizing, has been found to further enhance the adhesion of the composition, and increase the flash point of the composition, in addition to being a rust inhibitor. In the commercial formulation of the rosin oil which was used was one sold under the trade name "LONDON H. P." by Fisher Chemical of Great Britain.

The final major ingredient of the coating composition of the present invention is an organic solvent, the amount of which is determined by the desired viscosity of the final composition. Examples of suitable solvents include various chlorinated hydrocarbon solvents as well as hydrocarbon solvents such as mineral spirits, naptha, kerosene, Stoddard solvents, Rule 66 mineral spirits, toluene and gas. The selection of an appropriate solvent, as well as some of the desirable properties for use herein, is discussed in greater detail in U.S. Pat. No. 3,434,851, which is incorporated herein by reference.

The coating composition as described herein is preferred because it provides an effective rust inhibitor, rust barrier, and sound deadener which has greater adherence to metal substrates than conventional prior art undercoatings. In addition, the composition of the present invention has shown good wearability, sprayability and improved resistance to sagging and dripping, but with the capillary quality necessary for penetration of seams, hidden areas and areas which are already slightly rusted. The dried or cured coating has also been found to possess good dielectric properties, good ability as a moisture repellant, and excellent resistance to the "wicking" of moisture.

As an aid in understanding the coating composition of the present invention, reference will now be made to the manner of preparing the formulation. Typically, such formulations are prepared in a steam jacketed kettle in which it is possible to achieve good agitation of the mixture. Initially, the liquid asphalt is added to the kettle and heated to a mixing temperature in the range of about 55° C. to about 60° C. The soap is mixed with the asphalt and heat is added until the mixture is again at the mixing temperature. Next, the polyamide resin and rosin oil are added and the entire mixture is agitated and after about 10 minutes, the petroleum sulfonates are added and the entire mixture again agitated, then heated at a temperature of about 57° C. for about one and one-half hours until the entire mixture becomes thixotropic. It should be noted that, typically, the petroleum sulfonates contain a major portion of the required solvent, although some or all of the solvent may be added separately, preferably as the final ingredient. After a cooling period of approximately 18 hours, the composition is ready to be used.

Preferably, the coating composition of the present invention is of such a viscosity that it may be applied by the use of "airless" equipment, such as a Model 8596 Alemite spray gun. Also, the viscosity should be such that a coating having a thickness in the range of about 7 to 10 mils will adhere to the substrate with a minimum of dripping, but will set up within a sufficiently short period of time to permit one-day service.

EXAMPLE

A single preferred composition according to the present invention would have the following composition, with each of the ingredients being accompanied by its respective percentage, on a volume basis:

| Ingredient | Percentage |
| --- | --- |
| Liquid asphalt | 21.0 |
| polyamide resin | 4.0 |
| rosin oil | 4.0 |
| calcium-sodium petroleium sulfonate | 39.3 |
| metallic soap | 12.0 |
| mineral spirits | 19.7 |
| | 100.0% |

In preparing a specific formulation in accordance with the teachings of the present invention, it should be understood that certain variations from the preferred proportions may provide a satisfactory composition, although generally requiring a proportional adjustment in the percentage of one or more of the other ingredients. For example, if no rosin oil were present in the formula, it would be desirable to increase the percentage by volume of the polyamide resin to about 16% of the total. Similarly, if the amount of the metallic soap present is near the top of the 1% to 35% range taught herein, it would be preferred to decrease somewhat the percentage of either the petroleum sulfonate or the asphaltic bitumen, or both. As a final example, if the percentage of the organic adhesive and corrosion inhibitor (i.e., the polyamide resin and rosin oil) is toward the low end of the preferred range, or even lower, it will generally be necessary to add to the composition a material which is a chemical dryer, such as a cobalt, manganese or zirconium. This will help the coating to set up after it is sprayed, rather than relying strictly on air drying (i.e., evaporation of the solvent).

What is claimed is:

1. A one-part corrosion resistant coating composition for metallic substrates comprising:
   (a) about 15% to about 30% by volume of an asphaltic bitumen having a needle penetration in the range of about 25 to about 35;
   (b) about 20% to about 60% by volume of a petroleum sulfonate;
   (c) about 4% to about 16% by volume of an organic adhesive and corrosion inhibitor selected from the group consisting of a liquid polyamide resin having a Brookfield viscosity in the range of about 6 to about 10 poises at a temperature of 75° C., rosin oil and mixtures thereof; and
   (d) an organic solvent in an amount sufficient to yield a composition having a viscosity suitable for spraying of said composition.

2. A coating composition as claimed in claim 1 including about 1% to about 35% by volume of a soap selected from the group consisting of metal soaps and bentonite soaps of fatty acids.

3. A coating composition as claimed in claim 1 wherein said organic adhesive and corrosion inhibitor comprises about 3% to about 8% by volume of said liquid polyamide resin and about 1% to about 8% by volume of rosin oil.

4. A coating composition as claimed in claim 1 including a carrier material for said petroleum sulfonate, said carrier material being selected from the group consisting of microcrystalline wax, a parafinic oil, and mixtures thereof.

5. A one-part corrosion resistant coating composition for metallic substrates consisting essentially of:
   (a) about 15% to about 30% by volume of an asphaltic bitumen having a needle penetration in the range of about 25 to about 35;
   (b) about 20% to about 60% by volume of a petroleum sulfonate containing a metal selected from the group consisting of calcium, sodium, and mixtures thereof;
   (c) about 3% to about 8% by volume of a liquid polyamide resin having an amine value from about 300 to about 400;
   (d) about 1% to about 8% by volume of rosin oil; and
   (e) an organic solvent selected from the group consisting of hydrocarbon solvents; chlorinated hydrocarbon solvents, and mixtures thereof, said solvent being present in an amount sufficient to yield a composition having a viscosity suitable for spraying of said composition.

6. A coating composition as claimed in claim 5 wherein said liquid polyamide resin has a Brookfield viscosity in the range of about 6 to about 10 poises at a temperature of 75° C.

7. A one-part corrosion resistant coating composition for metallic substrates consisting essentially of:
   (a) about 15% to about 30% by volume of an asphaltic bitumen having a needle penetration in the range of about 25 to about 35;
   (b) about 20% to about 60% by volume of a petroleum sulfonate containing metal selected from the group consisting of calcium, sodium, and mixtures thereof;
   (c) about 3% to about 8% by volume of a liquid polyamide resin and an amine value fom about 300 to about 400;
   (d) about 1% to about 8% by volume of rosin oil; and
   (e) an organic solvent selected from the group consisting of hydrocarbon solvents, chlorinated hydrocarbon solvents, and mixtures thereof, said solvent being present in an amount sufficient to yield a composition having a viscosity suitable for spraying of said composition;
   (f) about 1% to about 35% by volume of a soap selected from the group consisting of metal soaps and bentonite soaps of fatty acids.

* * * * *